Figure 1:
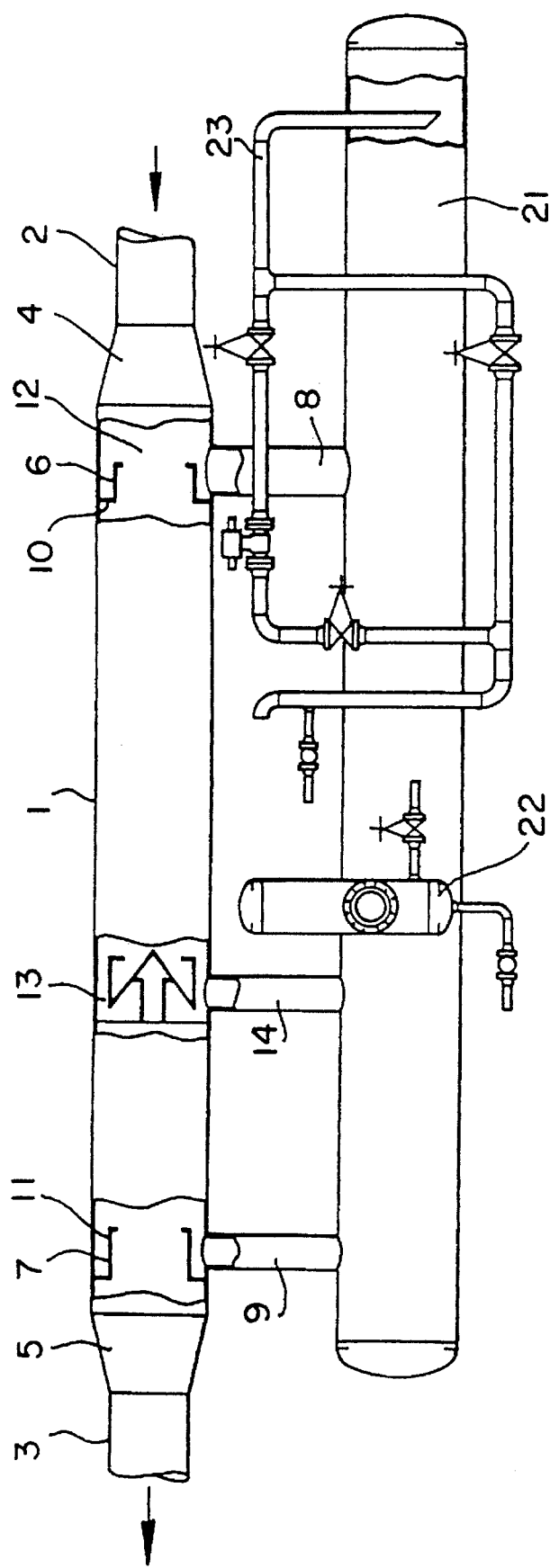

United States Patent [19]

Abdullayev

[11] Patent Number: 5,510,017
[45] Date of Patent: Apr. 23, 1996

[54] PIPE LIQUID/GAS SEPARATOR HAVING VANE SETS

[75] Inventor: Enver A. Abdullayev, Baku, Azerbaijan

[73] Assignee: Merpro Azgaz Limited, Scotland

[21] Appl. No.: 307,823

[22] PCT Filed: May 26, 1993

[86] PCT No.: PCT/GB93/01091

§ 371 Date: Jan. 18, 1995

§ 102(e) Date: Jan. 18, 1995

[87] PCT Pub. No.: WO93/24204

PCT Pub. Date: Dec. 9, 1993

[30] Foreign Application Priority Data

Jun. 2, 1992 [GB] United Kingdom ............... 9211663

[51] Int. Cl.$^6$ .................... B01D 17/12; B01D 19/00
[52] U.S. Cl. .................... 210/86; 55/452; 55/456; 96/157; 96/215; 210/512.1
[58] Field of Search ............... 210/86, 97, 104, 210/188, 512.1, 512.3; 96/157, 194, 195, 204, 206, 207, 208, 215, 216; 55/447, 452, 456; 166/75.1, 267; 415/169.3, 169.4

[56] References Cited

U.S. PATENT DOCUMENTS 1,273,595  7/1918  Fisher ........................ 55/452
3,258,895  7/1966  Wiebe et al. ............... 55/452
4,187,089  2/1980  Hodgson .

FOREIGN PATENT DOCUMENTS 1605135  3/1973  France .
2458819  6/1976  Germany .
2702148  7/1978  Germany .
1206007  11/1970  United Kingdom .

*Primary Examiner*—Joseph W. Drodge
*Attorney, Agent, or Firm*—Andrus Sceales Starke & Sawall

[57] ABSTRACT

A liquid/gas separator has a pipe section receiving a liquid/gas mixture to be separated and discharging gas that is substantially free of liquid. A first drain (8) is coupled to the upstream end of the pipe section for draining liquid that has undergone preliminary separation from the gas. A plurality of fixed vanes (15,16) are arranged in a pair of vane sets positioned in the pipe section downstream of the first drain. The vane sets are concentrically mounted in the pipe section to form a radially inner vane set and a radially outer vane set. The vanes of each vane set are disposed about the axis of the pipe section and oriented to impart a swirl to the liquid/gas mixture causing further separation of the liquid from the gas. A second drain (9) downstream of the vanes drains liquid that is separated from the gas by the vanes.

16 Claims, 5 Drawing Sheets

PIPE LIQUID/GAS SEPARATOR HAVING VANE SETS

The present invention relates to a method and apparatus for separating liquid contained in a liquid/gas mixture.

Gas extracted from a well is commonly contaminated by liquid which has to be removed. Drying facilities are conventionally provided at the production site to perform this removal. However, space on the production site is at a premium. Further, any breakdown or maintenance which causes the separator to be out of use may reduce the capacity of the site.

According to the present invention a liquid/gas separator comprises a pipe section having an inlet, in use, connected to an upstream part of a liquid/gas supply pipe and an outlet, in use, connected to a downstream part of the supply pipe; the pipe section containing a first drain for draining liquid which has undergone preliminary separation; a plurality of fixed vanes downstream of the first drain arranged, in use, to swirl the liquid/gas mixture to cause further separation; and a second drain downstream of the vanes to separate the liquid which has undergone the further separation; wherein, in use, gas which is substantially free of liquid leaves the separator through the outlet.

The separator of the present invention being housed within a pipe section can be fitted into a conventional supply pipe. The space needed for the separator is therefore minimal. The separator need have no moving parts and therefore has excellent reliability and needs little maintenance.

The vanes may be arranged in any configuration which causes the liquid/gas mixture to swirl. The best separation is provided by two sets of vanes, a radially outer and a radially inner set, arranged in parallel which are each symmetrically disposed around the axis of the pipe section. The vanes are inclined in the direction of the flow of the liquid/gas mixture and are circumferentially inclined. The radially outer set of vanes preferably comprises more vanes than the radially inner set of vanes. Also, the radially outer set of vanes are preferably inclined at a steeper angle with respect to the axis of the pipe.

The inlet of the pipe section is preferably flared in the direction of flow of the liquid/gas mixture. This causes the mixture to undergo the preliminary separation.

To improve the drainage of the liquid from the separator, a third drain may be provided adjacent to the vanes.

The drains preferably lead into a common tank. Advantageously, means are provided to monitor and control the level of liquid in the tank.

More than one of the above described separators may be provided in series further to improve the drying process.

Figure 2:
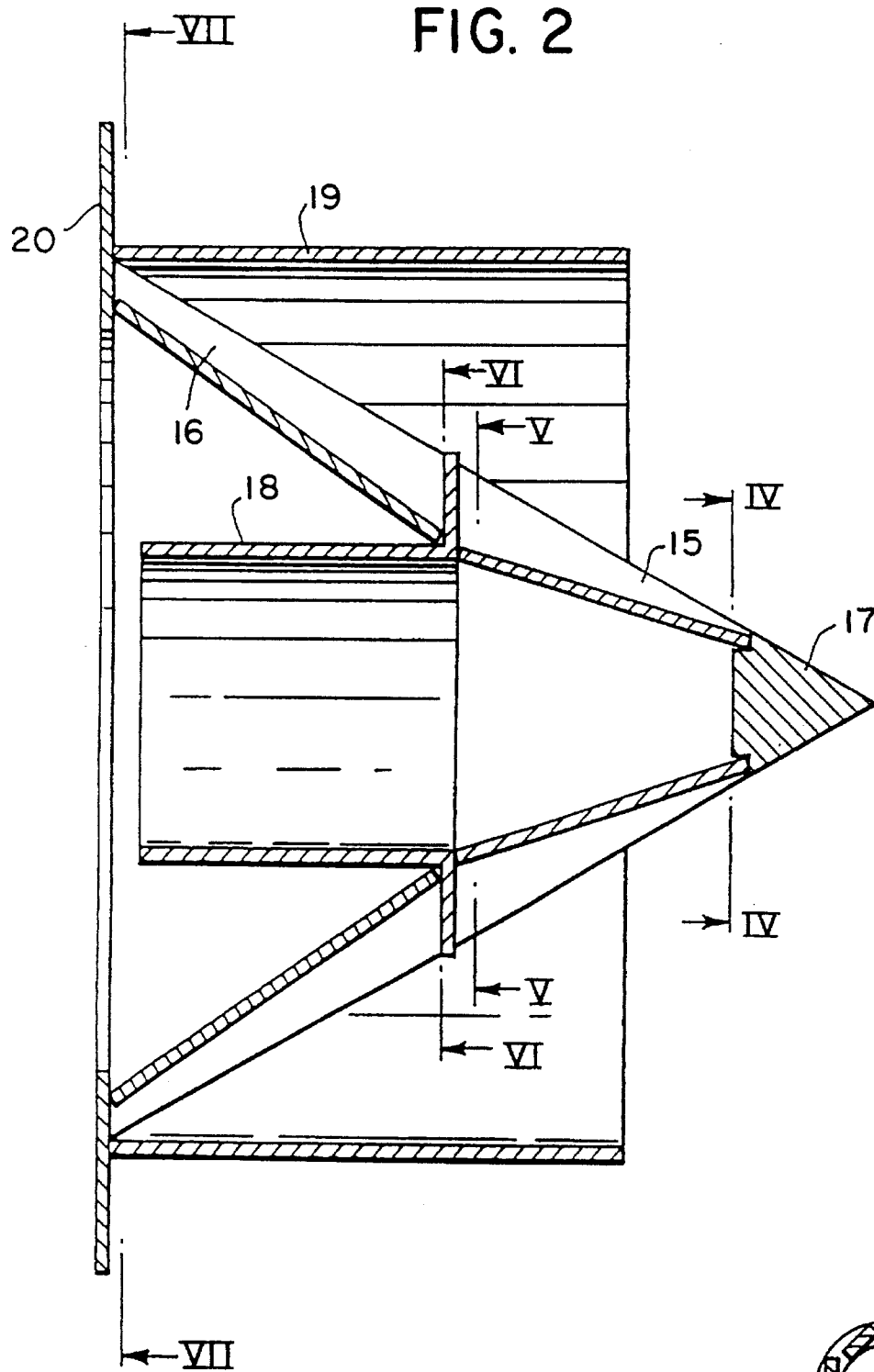
Figure 4:
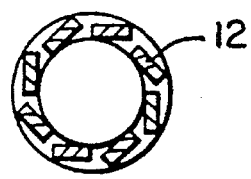
Figure 3:
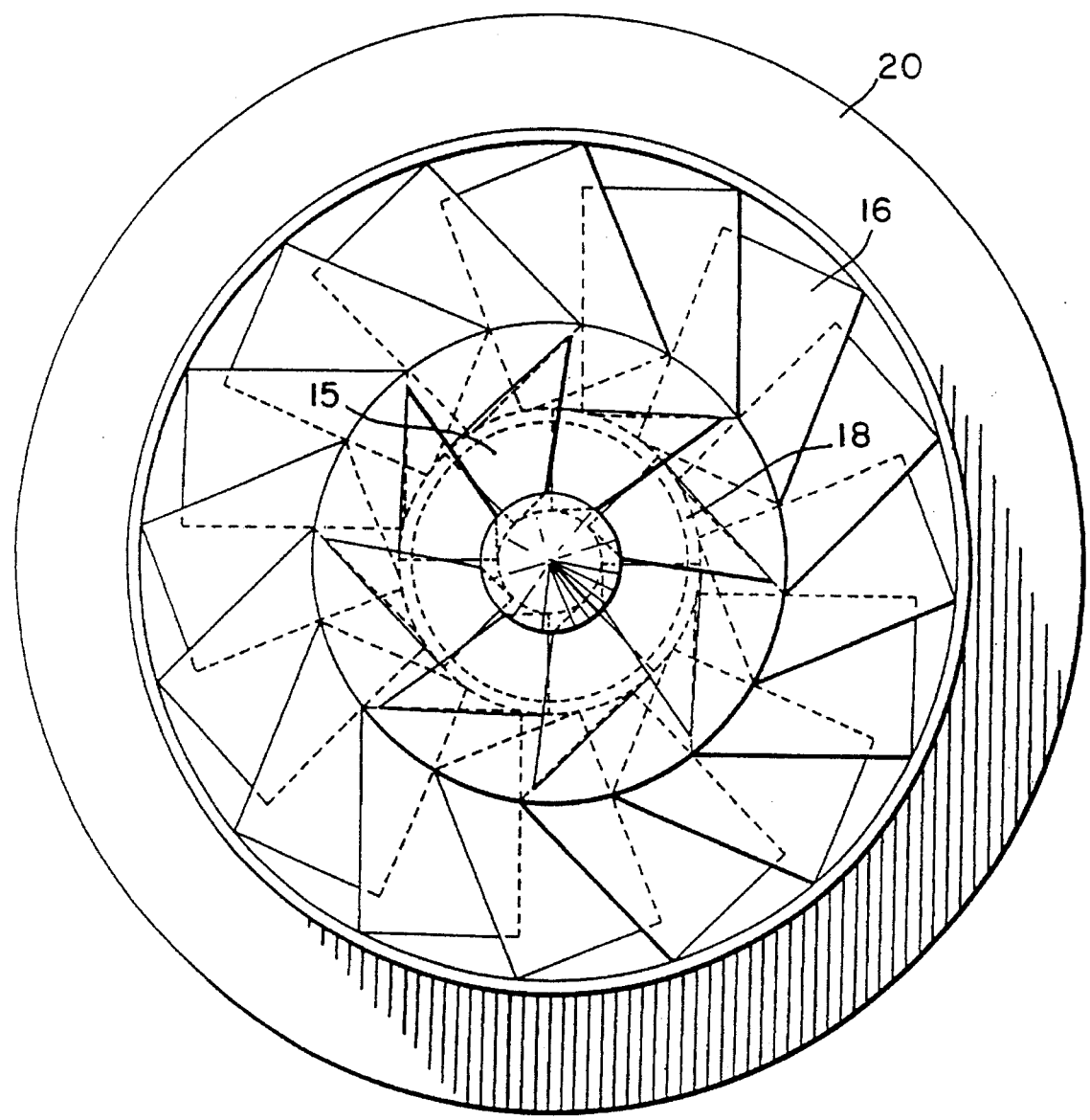
Figure 5:
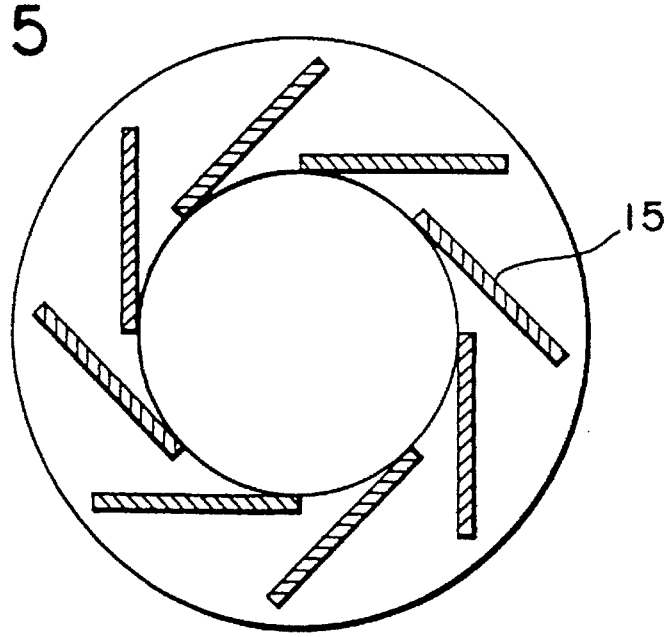
Figure 6:
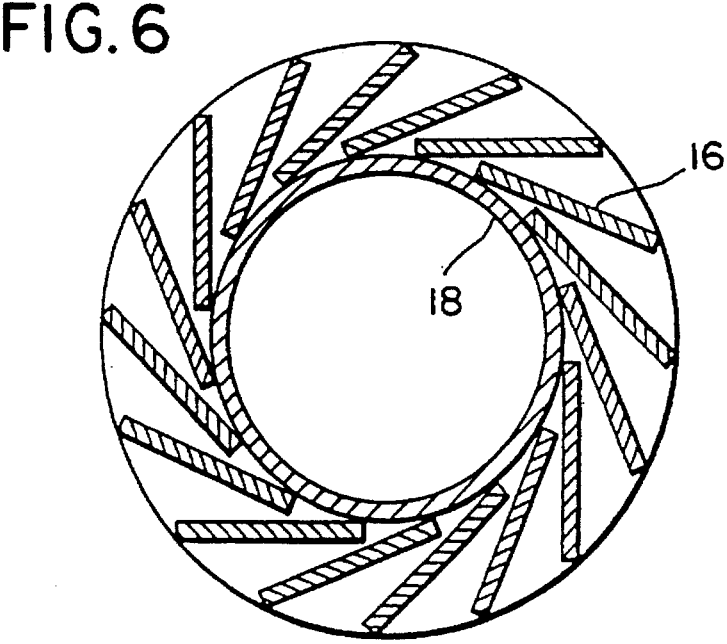
Figure 7:
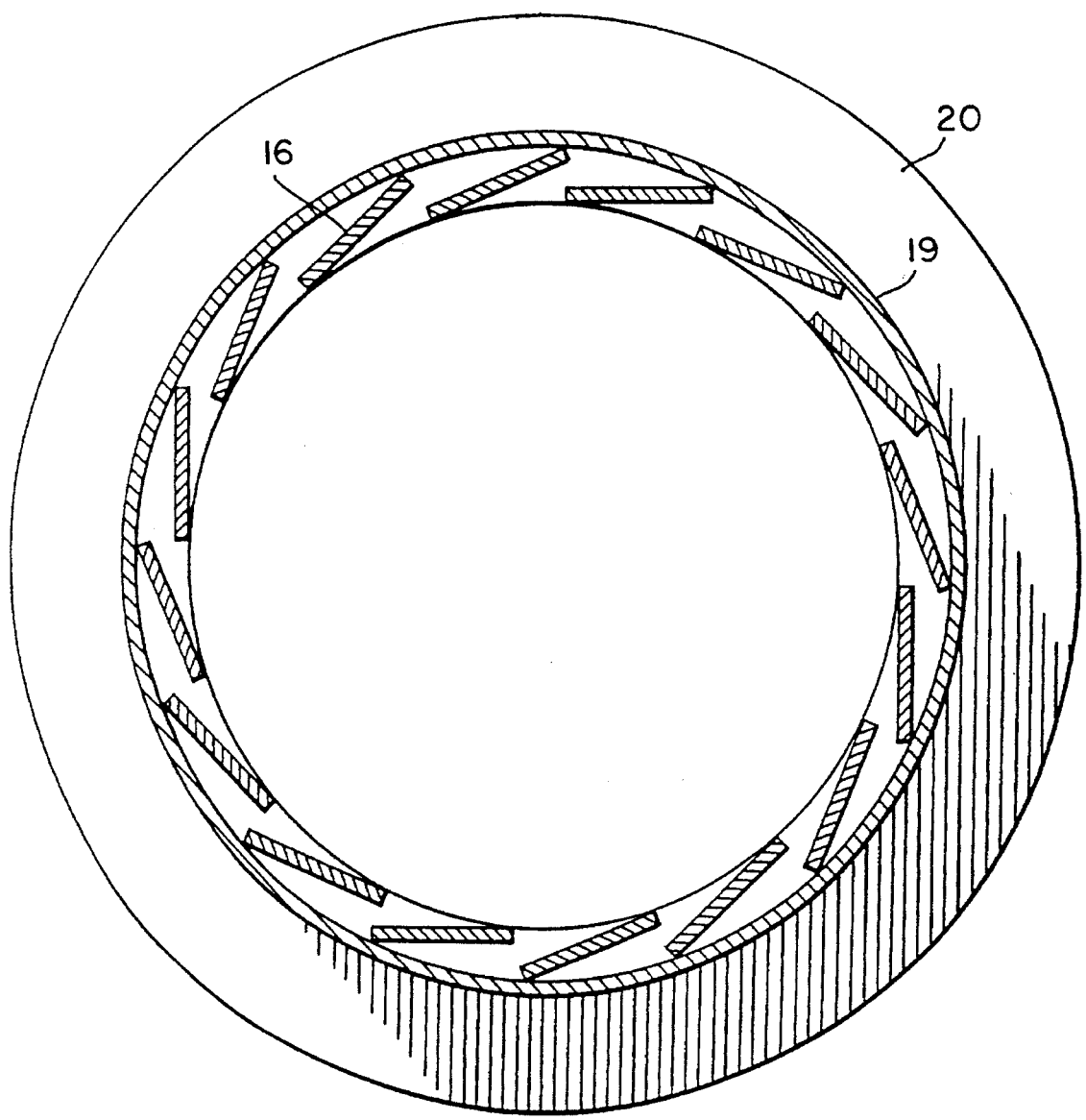

An example of a separator constructed in accordance with the present invention will now be described with reference to the accompanying drawings, in which:

FIG. 1 is an axial section through the pipe and the tank;
FIG. 2 is an axial section through the vanes;
FIG. 3 is a front elevation of the vanes;
FIG. 4 is a section taken along line IV—IV in FIG. 2;
FIG. 5 is a section taken along line V—V in FIG. 2;
FIG. 6 is a section taken along line VI—VI in FIG. 2;
FIG. 7 is a section taken along line VII—VII in FIG. 2.

As shown in FIG. 1, the separator is housed in a pipe section 1 which is fitted between an upstream part 2 and a downstream part 3 of a liquid/gas supply pipe.

A concentric expander 4 and a concentric reducer 5 join the upstream end and the downstream end respectively of the pipe section 1 to the liquid/gas supply pipe.

Two diffusers 6, 7 are sealed to the inner wall of the pipe section 1 adjacent upstream and downstream ends respectively of the pipe section 1. Each diffuser comprises an annular plate 10 sealed to the wall of the pipe section 1 and a tubular sleeve 11 extending upstream from the inner edge of the annular plate. This leaves a gap 12 at the radially central region of the pipe. Thus a trap is formed by the annular plate 10 and tubular sleeve 11 to trap liquid flowing at the radially outer part of the pipe section 1. Drains 8, 9 are provided adjacent to the tubular sleeves 11 of the respective diffusers 6,7.

A combined swirler/diffuser 13 is provided between the diffusers 6, 7 and is associated with a third drain 14. As shown in FIGS. 2–7, the swirler comprises a radially inner 15 and a radially outer 16 set of vanes shown in FIGS. 2 to 7. The radially inner set of vanes 15 consists of eight vanes which are forwardly inclined with respect to the axis of the pipe section 1. The radially outer set of vanes 16 consists of sixteen vanes which are forwardly inclined with respect to the axis of the pipe at a steeper angle than the vanes of the radially inner set 15. A conical deflector is provided at the upstream end of the swirler to direct the liquid/gas mixture flowing adjacent to the axis of the pipe towards the vanes 15, 16. An inner sleeve 18 provides a flow path for liquid/gas mixture leaving the radially inner set of vanes 15. An outer sleeve 19 and an annular plate 20 which is sealed to the wall of pipe section 1 to provide a diffuser similar to the two previously described diffusers 6, 7.

The three drains 8, 9, 14 lead to a common liquid tank 21 which is provided with a sight level gauge 22. A network of pipes 23 is provided for the removal of liquid from the tank 21.

In use, the liquid/gas mixture flowing in the supply pipe enters the separator through expander 4. The expansion of the mixture results in a small decrease of its velocity which allows some natural separation of the liquid from the gas to take place. The liquid particles which separate out are typically 10–15 μm in diameter. These fall out of the gas phase towards the outer wall of the separator and are trapped by the diffuser 6. The trapped liquid is caused to flow under gravity around the outside of the sleeve 11 and subsequently to drain through drain 8. The gas phase being lighter than the liquid phase keeps to the centre of the pipe and passes through the gap 12 in the diffuser 6.

As the partially separated mixture progresses along the pipe section, some further natural separation takes place and liquid separating at this time is trapped by the diffuser 19, 20 of the combined swirler/diffuser 13 and is drained through the drain 14.

The rest of the mixture encounters the two sets of vanes 15, 16 and is caused to swirl. The mixture travelling closer to the axis of the pipe will flow between the radially inner vanes 15, possibly after having been deflected by the conical deflector 17 and will flow through the inner sleeve 18. The mixture flowing further from the axis of the pipe section 1 which flows inside outer sleeve 19 passes between the vanes 16 and leaves the swirler/diffuser 13 through the hole in the annular plate 20. Thus the swirler 13 creates a variable swirl which causes coagulated droplets to be thrown towards the outer wall of the pipe section 1. The liquid which is separated in this way is trapped by diffuser 7 and drains through the drain 9.

The dried gas, now up to 98% dry, passes through the reducer 5 and returns to the downstream end 3 of the supply pipe.

The level of liquid in the tank 21, which has drained through the drains 8, 9, 14 is monitored by sight level gauge 22 and its level is maintained by liquid take off pipes 23 controlled by choke valves.

I claim:

1. A liquid/gas separator suitable for use with a supply pipe containing a liquid/gas mixture, said separator comprising:

a pipe section (1) having an inlet portion that is connectable, in use, to an upstream part (2) of the supply pipe to receive the liquid/gas mixture, said pipe section having an outlet portion spaced from said inlet portion along an axis of said pipe section, said outlet portion being connectable, in use, to a downstream part (3) of the supply pipe to discharge gas that is substantially free of liquid;

a first drain (8) coupled to said pipe section proximate to said inlet portion for draining liquid, from said pipe section, that has undergone preliminary separation from the gas;

a plurality of fixed vanes (15,16) arranged in a pair of vane sets positioned in said pipe section downstream of said first drain, said vane sets being mounted in said pipe section with respect to said axis of said pipe section to form a radially inner vane set that intercepts a central portion of the liquid/gas mixture in said pipe section and an adjacent radially outer vane set that intercepts a peripheral portion of the liquid/gas mixture in said pipe section, the vanes of each of said vane sets being oriented with respect to said axis to impart a swirl to the liquid/gas mixture around said axis causing further separation of the liquid from the gas; and a second drain (9) downstream of said vanes for draining, from said pipe section, liquid that is separated from the gas by said vanes.

2. A separator according to claim 1 wherein said radially outer vane set has more vanes than said radially inner vane set.

3. A separator according to claim 2 wherein the orientation of said vanes is such that said vanes are inclined with respect to said axis of said pipe section and wherein said vanes of said vane sets are circumferentially spaced about said axis and lie at predetermined angles with respect to radii extending from said axis.

4. A separator according to claim 3 wherein said vanes have edges that are leading and edges that are trailing with respect to fluid flow in said pipe section from said inlet portion to said outlet portion, and wherein the inclination of said vanes with respect to said axis of said pipe section is such that said leading edges of said vanes are closer to said axis of said pipe section than said trailing edges of said vanes.

5. A separator according to claim 3 wherein the vanes of said radially outer vane set are inclined at a greater angle with respect to the axis of said pipe section than the vanes of said inner vane set.

6. A separator according to claim 1 wherein the orientation of said vanes is such that said vanes are inclined with respect to said axis of said pipe section and wherein said vanes of said vane sets are circumferentially spaced about said axis and lie at predetermined angles with respect to radii extending from said axis.

7. A separator according to claim 6 wherein said vanes have edges that are leading and edges that are trailing with respect to fluid flow in said pipe section from said inlet portion to said outlet portion, and wherein the inclination of said vanes with respect to said axis of said pipe section is such that said leading edges of said vanes are closer to said axis of said pipe section than said trailing edges of said vanes.

8. A separator according to claim 6 wherein the vanes of said radially outer vane set are inclined at a greater angle with respect to the axis of said pipe section than the vanes of said inner vane set.

9. A separator according to claim 1 wherein a cross sectional area of said inlet portion of said pipe section is greater than a cross sectional area of the supply pipe, thereby to allow said liquid/gas mixture to expand upon entering said pipe section to provide preliminary separation of the liquid from the gas.

10. A separator according to claim 1 further including a third drain coupled to said pipe section proximate to said plurality of vanes for draining liquid from said pipe section.

11. A separator according to claim 10 further including a tank coupled to said drains for receiving the separated liquid drained from said pipe section.

12. A separator according to claim 11 further including means for monitoring and controlling the level of liquid in said tank.

13. A separator according to claim 1 further including a tank coupled to said drains for receiving the separated liquid drained from said pipe section.

14. A separator according to claim 13 further including means for monitoring and controlling the level of liquid in said tank.

15. A separator according to claim 1 wherein said pipe section has a wall and wherein said separator further includes respective trap means (6,7) associated with said first drain and second drain to trap liquid flowing adjacent to said wall of said pipe section and to guide it toward said drains.

16. A liquid/gas separator according to claim 1 having a liquid/gas separator of similar construction connected in series therewith.

* * * * *